June 18, 1940.                  P. J. P. RATIE                   2,204,696
           MACHINE FOR MANUFACTURING PROPELLER BLADES BY COPYING
                    Filed Dec. 31, 1937         8 Sheets-Sheet 1
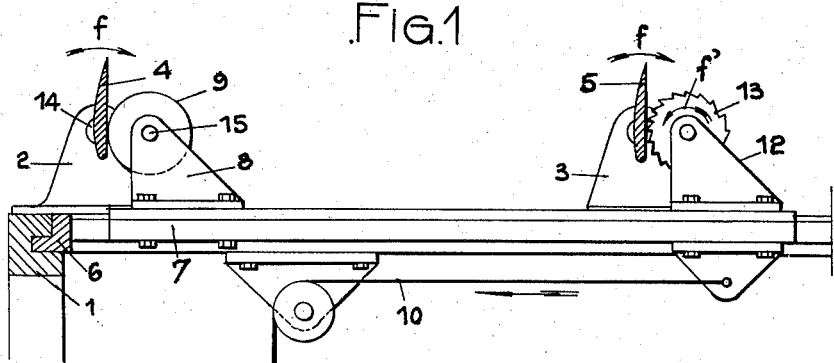
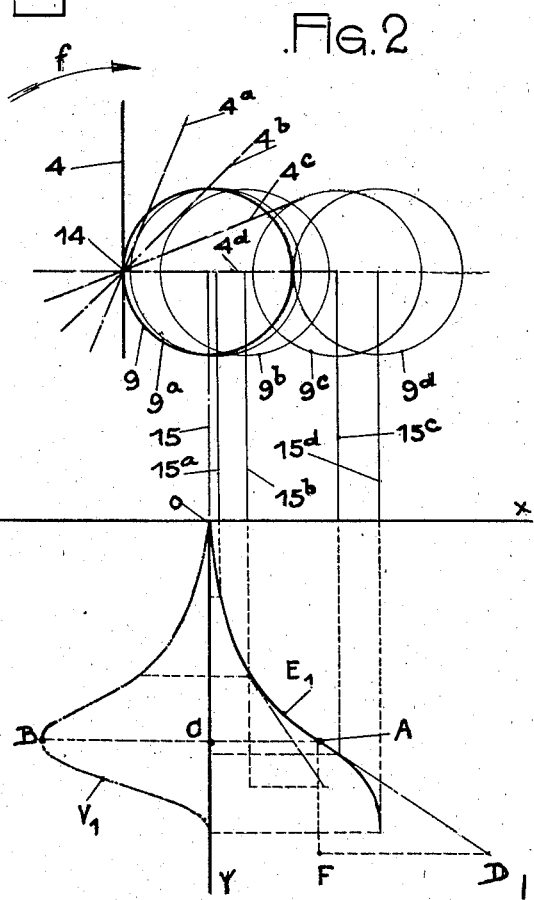
INVENTOR:
PAULIN JEAN PIÉRRE RATIÉ
BY Haseltine Lake & Co.
ATTORNEYS June 18, 1940.   P. J. P. RATIE   2,204,696
MACHINE FOR MANUFACTURING PROPELLER BLADES BY COPYING
Filed Dec. 31, 1937   8 Sheets-Sheet 2

INVENTOR:
PAULIN JEAN PIÉRRE RATIÉ
BY Haseltine Lake & Co.
ATTORNEYS

June 18, 1940.   P. J. P. RATIE   2,204,696
MACHINE FOR MANUFACTURING PROPELLER BLADES BY COPYING
Filed Dec. 31, 1937   8 Sheets-Sheet 5
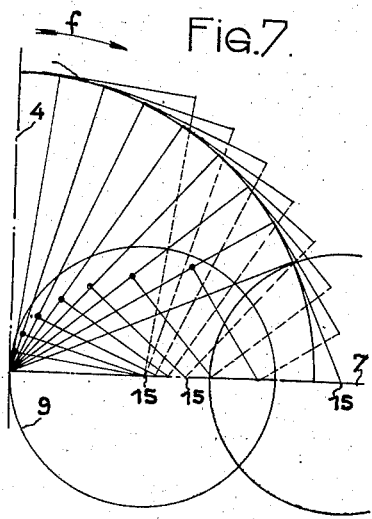
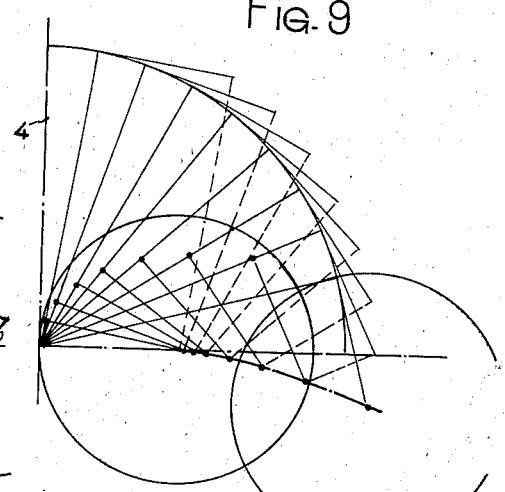
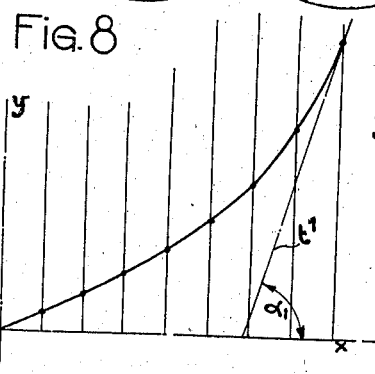
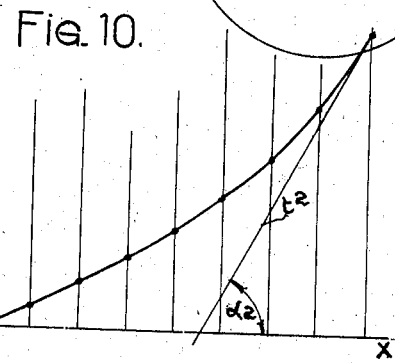
INVENTOR:
PAULIN JEAN PIÉRRE RATIÉ
BY Haseltine, Lake & Co.
ATTORNEYS June 18, 1940.　　　　P. J. P. RATIE　　　　2,204,696
MACHINE FOR MANUFACTURING PROPELLER BLADES BY COPYING
Filed Dec. 31, 1937　　　　8 Sheets-Sheet 6

INVENTOR:
PAULIN JEAN PIÉRRE RATIÉ
BY Haseltine, Lake & Co.
ATTORNEYS

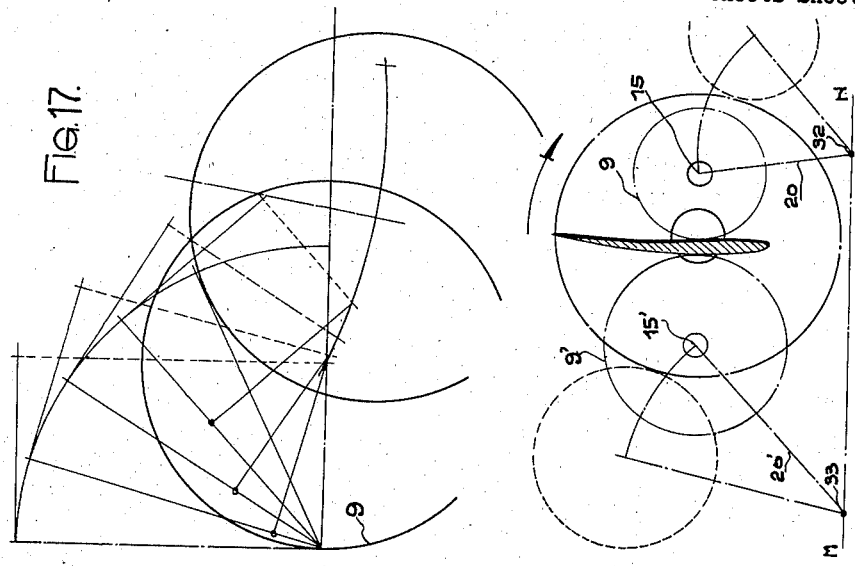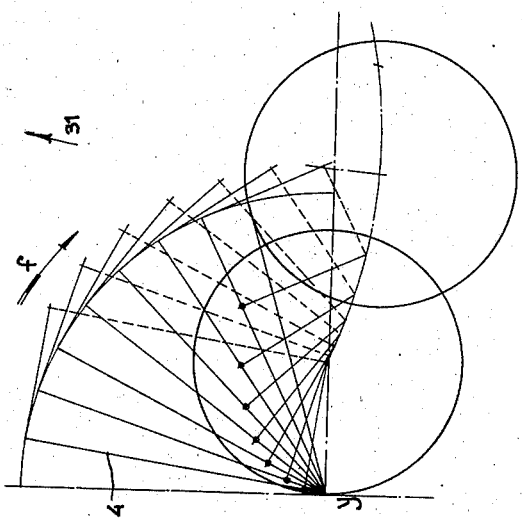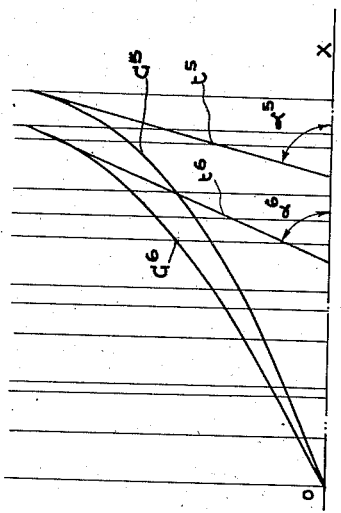

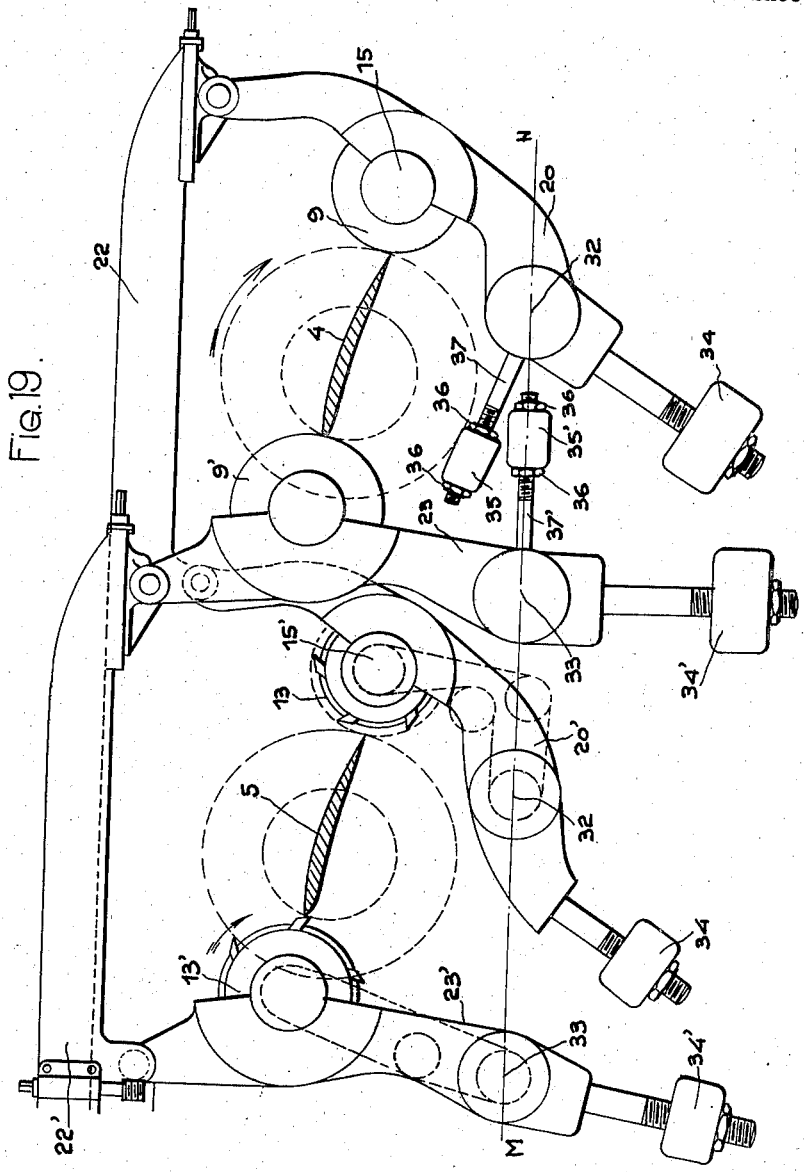

Patented June 18, 1940

2,204,696

UNITED STATES PATENT OFFICE 2,204,696

MACHINE FOR MANUFACTURING PROPELLER BLADES BY COPYING

Paulin Jean Pierre Ratié, Montrouge, Seine, France

Application December 31, 1937, Serial No. 182,819
In France January 4, 1937

4 Claims. (Cl. 90—13.3)

The invention relates to machines for manufacturing propeller blades by copying, of the kind having the following characteristics in combination:

(a) A cradle supports at least one pattern blade and at least one blank; the pattern blade and the blank both have a rotary movement about their axis and, of course, the rotations are synchronous.

(b) Two systems, each comprising a feeler in contact with the pattern blade and a tool in contact with the blank, are movable transversely to the blades; the feelers and the tools of the two systems act respectively on the opposite faces of the blades against which they are pressed by springs, counterweights, or equivalent means.

(c) Finally, means are provided whereby the cradle supporting the blades, and the systems which are movable transversely, are given a relative movement of translation parallel with the axis of rotation of the blades, which movement is imparted either to the cradle, or to a carriage supporting the movable systems.

The invention relates more particularly to the type of machines of the above referred to kind in which the feelers and the tools, in their transverse movement with respect to the blades, rotate about an axis which in principle is parallel with the axis of rotation of the blades, excluding the type in which the feelers and the tools have a rectilinear movement perpendicular to the axis of rotation of the blades.

The invention has for its object to overcome the drawbacks of this type of machine. Said drawbacks are set forth in the ensuing description together with the characteristics of the invention, reference being had to the acompanying diagrammatical drawings which are only given by way of example.

In said drawings:

Fig. 1 shows a known machine having a single movable system with rectilinear movement.

Fig. 2 is a diagram relating to said machine.

Figs. 7 to 18 are diagrams and explanatory diagrammatical illustrations.

Fig. 19 shows a second embodiment of an improved machine according to the invention.

Figure 3:
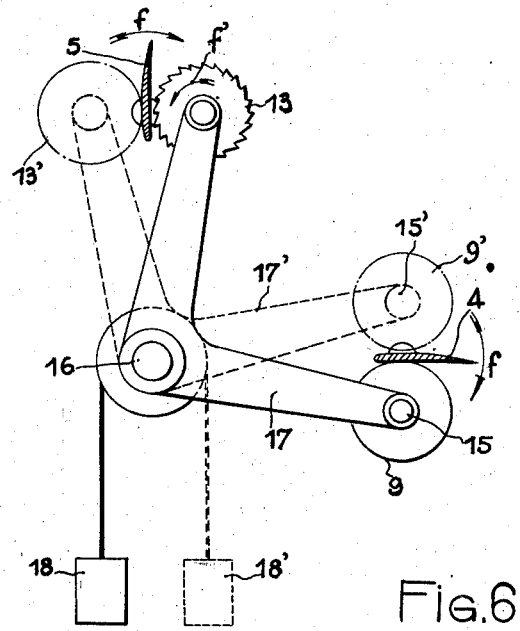
Fig. 3 shows a known machine having a double movable system with curvilinear movement.

The known machine shown in Fig. 1 comprises a fixed bed 1 which, by means of headstocks such as 2 and 3, supports on the one hand a pattern blade 4, and on the other hand a blank 5 to be worked. A motor, not shown, drives in synchronism the blade 4 and the blank 5 with a rotary movement in the direction indicated by the arrow $f$.

Inside the bed 1, a carriage 6 is adapted to move longitudinally, that is to say parallel with the axes of rotation of the blade 4 and of the blank 5. The movement of the carriage 6 is produced automatically in the well known manner by a worm which has not been shown, since this feed mechanism is very well known, it being in all respects similar to the one which feeds the carriage of a lathe. Furthermore, inside the carriage 6 is a second carriage 7 which is movable perpendicular to the axes of rotation of the blade 4 and of the blank 5. The carriage 7 receives, by means of a support 8, a feeler 9 which is held constantly in contact with the pattern blade 4 by the pull of a cable 10 on which is suspended a weight 11.

Said weight could be replaced by a spring or a pneumatic pressure. By means of a support 12, the carriage 7 carries a tool 13 such as a milling cutter, which a motor not shown rotates in the direction of the arrow $f^1$. It is obvious that if the milling cutter 13 is of the same diameter as the feeler 9, said milling cutter will give on the blank 5 a contour which is exactly identical with that of the blade 4.

In Fig. 2, has been shown the diagram of the distances and the diagram of the speeds of the movement of translation of the carriage 7 perpendicular to the axis of rotation of the pattern blade 4. Said blade has been shown diagrammatically by a straight line for the sake of simplicity. The blade rotates about the shaft 14, and its movement has been studied throughout the period in which the feeler 9 moves away from the axis of rotation 14 under the thrust produced by the rotation of the blade 4. The latter successively takes up the positions 4—$4^a$—$4^b$—$4^c$ and $4^d$. The feeler 9 successively takes up the positions 15—$15^a$—$15^b$—$15^c$ and $15^d$. The successive positions of the spindle 15 have been plotted along the axis OX, and the angles successively formed by the blade 4 have been plotted along the axis OY. The curve $E^1$ of the distances is thus obtained. The curve $V^1$ of the speeds is very easily deduced therefrom, since said curve is the substitution, at each point, of the tangent at the different points of the curve $E^1$. For example, to the point A where the slope of the curve $E^1$ is maximum, there corresponds the point B of the maximum of the curve $V^1$. In order to plot the ordinate BC of said point B, it suffices to draw the tangent AD to the curve $E^1$ at the point A, to draw a straight line AF parallel with OY and equal to the unit chosen, then draw FD parallel with OX. It then suffices to make BC equal to FD.

It is observed that the variation of the speeds is considerable, that is to say that the maximum ordinate BC is great. This observation explains the fact that on the machines of the type of Fig. 1 it has been noticed that at certain instants the feeler 9 broke contact with the blade 4 and consequently that the tool 13 also came out of contact with the blank 5. This phenomenon had led constructors to increase, without appreciable result, the mass of the counterweight 11, or again to increase the strength of the retracting spring of the carriage 7, or again the pneumatic pressure replacing the spring. These means only form palliatives and had the drawback of excessively increasing the pressure on the blade 4 and on the blank 5.

In the machine shown in Fig. 3, there are two movable systems. Only one of same has been shown in Fig. 1, but it can be readily conceived that two of them could have been shown. However, the explanation would not be improved thereby since what has been stated in connection with one of the movable systems could have been stated identically for the other. The same does not apply to Fig. 3, because the movable systems of this figure are rotatively movable about the shaft 16, instead of being movable in a straight line in the transverse direction relatively to the pattern blade 4 and the blank 5.

As in the previous example, the pattern blade 4 and the blank 5 are rotated by a motor, not shown, in the direction of the arrow $f$. The feeler 9 and the tool 13 are mounted at the end of each of the arms of the lever 17 which rotates on the shaft 16, a counterweight 18 compelling the feeler 9 to remain in contact with the blade 4. Of course, the lever 17 is given, as before, an automatic movement of translation along the shaft 16 and the tool 13 is rotated in the direction of the arrow $f^1$.

The second movable system is shown in dotted lines. It is composed of identically the same members as the previous one, and its members have been designated by the same reference numerals but with an index.

Figure 4:
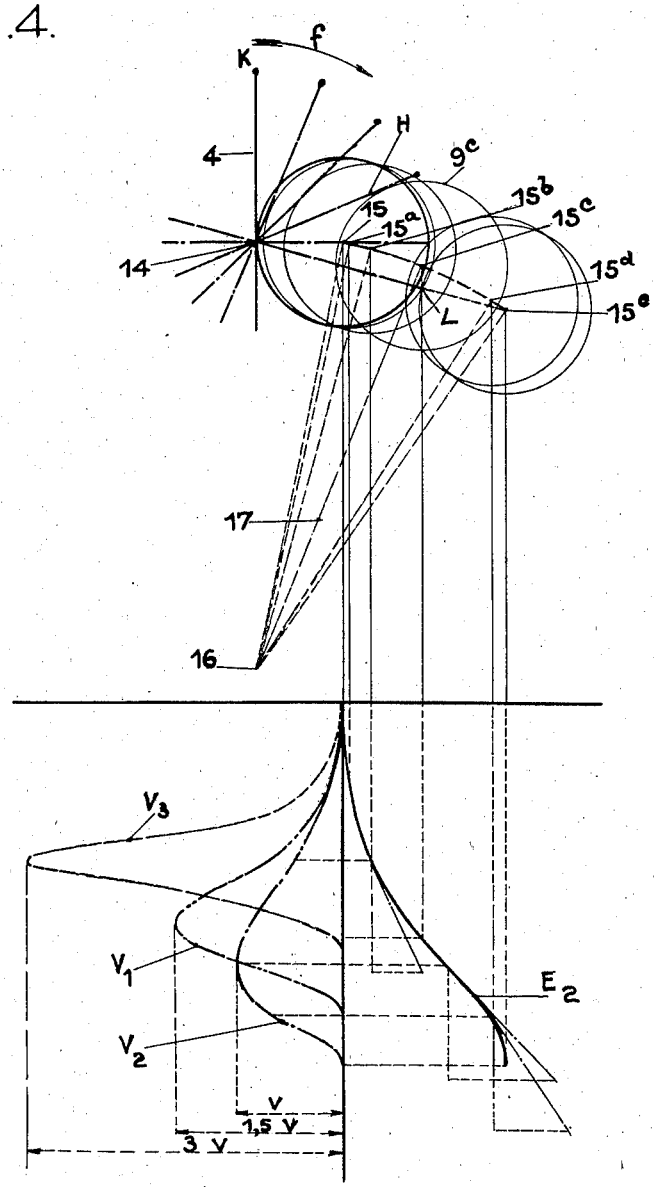
Fig. 4 is a diagram relating to one of the movable systems of this machine.

In Fig. 4 a diagram has been drawn in the same manner as in the case of Fig. 2, it will therefore not be necessary to repeat how said diagram has been constructed. It will be noted that the spindle 15 successively takes up the positions 15—15$^a$—15$^b$—15$^c$—15$^d$ and 15$^e$ and that the curve of the distances, which is visible at $E^2$, corresponds to the projections of the curvilinear displacement of the spindle 15 on the horizontal plane. The curve $V^2$ of the speeds can readily be deduced therefrom.

In this diagram of Fig. 4, the curve $V^1$ has also been drawn, so that it can be easily compared with the curve $V^2$. It can be seen that the maximum of the curve $V^2$ is distinctly lower than the maximum of the curve $V^1$. If V designates the maximum of the curve $V^2$, it will be seen that that of the curve $V^1$ is about 1.5 V.

Figure 5:
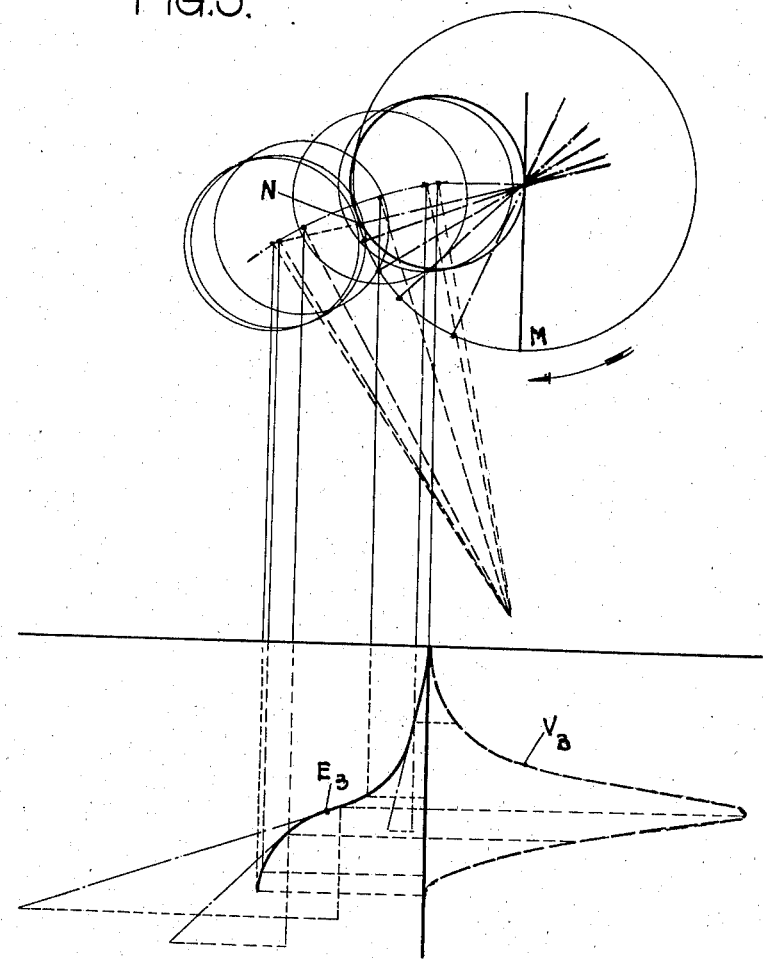
Fig. 5 is a diagram relating to the other movable system of said machine.

In Fig. 5, in the same manner as for Fig. 4, the diagram has been drawn of the speeds of the second movable system during the period in which the feeler $9^1$ moves away from the axis of rotation of the pattern blade 4.

The curve $E^3$ of the distances and the curve $V^3$ of the speeds is obtained, the latter curve having been inserted in Fig. 4. This curve is extremely accentuated and it can be seen that its maximum is equal to three times that of the curve $V^2$. The fact can then be satisfactorily explained that in the machines of the kind shown in Fig. 3, the drawback already observed in the machines according to Fig. 1 is considerably amplified, that is to say that the movable system 9'—17'—13' breaks contact with the pattern blade 4 and the blank 5 as through it were projected violently outwards.

The invention is the result of the comparison of the curves $V^2$, $V^1$ and $V^3$. It is obvious that the curve $V^2$ is by far the most advantageous, and that it would be of the greatest interest to construct a machine in which the two movable systems possess this speed diagram $V^2$. In order to obtain this result, it obviously suffices that the condition set forth in the preamble be fulfilled, that is to say that during the period in which the feeler or the tool moves away from the axis of rotation of the pattern blade or of the blank, the quadrilateral formed by (see Fig 4) the axis of rotation 14 of the blade, the axis 16 of oscillation of the lever 17, the axis 15$^c$ (for example) of rotation of the feeler 9 and the point H of contact between the blade 4 and the feeler should always form a convex quadrilateral. In fact, under these conditions, the time during which the feeler 9 moved away from the shaft 14 corresponds to the arc KL of rotation of the blade 4, which arc is greater than 90°. In Fig. 2 on the contrary, said arc is obviously only 90° and in Fig. 5 said arc which is shown at MN is distinctly less than 90°

Figure 6:
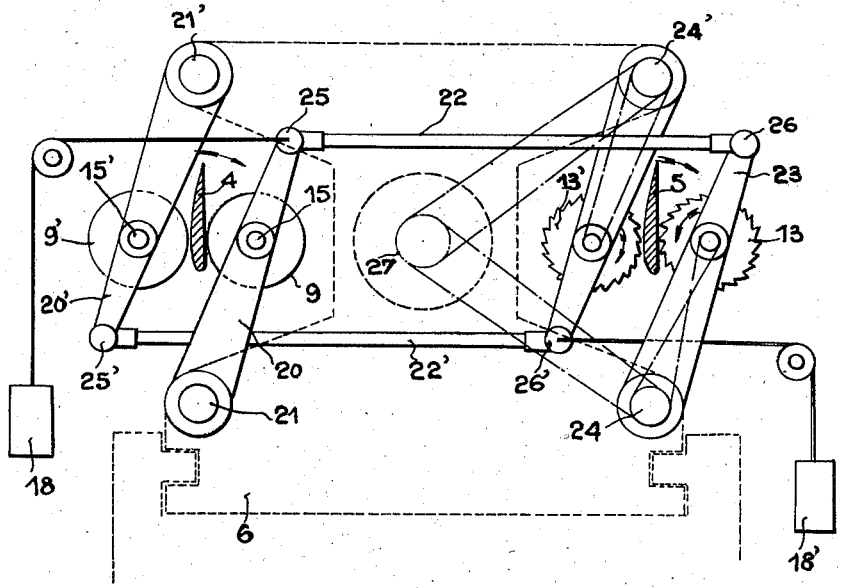
Fig. 6 shows a first embodiment of a machine according to the invention.

The machine according to Fig. 6 fulfills these conditions.

The first movable system comprises the feeler 9 which is pivoted at 15 on a lever 20 itself pivoted at 21 on the carriage 6. The lever 20 is connected by a connecting rod 22 to a second lever 23 identical with the lever 20 and pivoted at 24 on the carriage 6. The connecting rod 22 is pivoted at 25 and 26 on the levers 20 and 23, and the pivot pins 21—24—25—26 form a parallelogram. The tool 13 is mounted on the lever 23 and it is obvious that it cuts on the blank 5 an identical contour to that of the blade 4, under the same conditions as the tool 13 of Fig. 3. The second movable system is composed in exactly the same manner, but all its members are arranged symmetrically relatively to the axes of rotation of the blade 4 or of the blank 5. It is therefore not necessary to describe this second system, of which the members are designated by the same reference numerals with an index.

In Fig. 6, at 27 has been shown the pulley of the motor which actuates the tools 13 and 13' for example by means of belts which have been shown in chain dotted lines, but it is obvious that any other method of drive could be utilized.

It would be advantageous, in order to further decrease the minimum V of the speeds, to reduce the lever arms such as 15—21 to the smallest possible dimension, and it will be noted that the arrangement adopted facilitates this reduction. In fact, in the case of the movable system 9'—13' of Fig. 3, the distance 15'—16 cannot be reduced below a minimum which would correspond to the propping effect of the end of the blade against the feeler 9', which would of course absolutely prevent the operation. On the contrary, in the arrangement of Fig. 6, the decrease of the lever arm 21—15 is advantageous in all respects and it will be of the greatest advantage to reduce said lever arm to the minimum possible length.

Fig. 7 is a diagram relating to the machine of Fig. 1 in which the blade 4 is shown by a straight line. Said straight line is rotated in the direction of the arrow $f$. It drives before it the roller 9, of which the spindle 15 moves on the straight line 7. The points of contact of the roller 9 and the straight line 4 are shown by small points. The curve of the distances travelled along the straight line by the point of contact of the roller is plotted in Fig. 8, the angles travelled through by 4 being plotted along OX and the paths travelled through by the roller 9 on the straight line 4 being plotted along OY. It will be seen that this curve rises considerably towards its end, that is to say that the speed is the greatest towards the end of the blade. The tangent $t_1$ has been drawn at the end of the curve; said tangent $t_1$ forms the angle $\alpha_1$ with the axis OX. The speed is, as known, equal to the trigonometrical tangent of the angle $\alpha_1$. Now, an excess of speed of feed is particularly dangerous at this spot, and this drawback is exceedingly serious. To reduce same, it becomes necessary to limit the speed of rotation of the pattern blade 4 and of the blade to be worked 5, thereby decreasing the efficiency of the machine.

Figure 11:
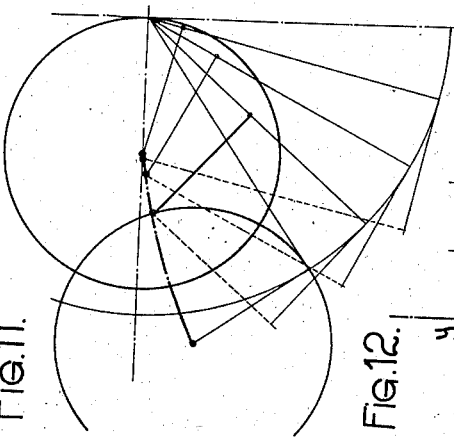
Figure 12:
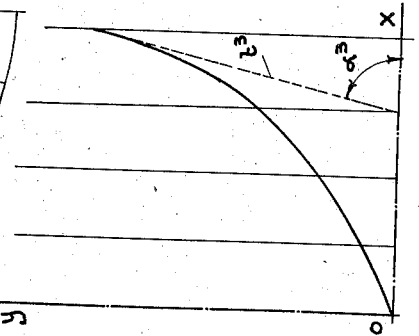

The curve of the distances which is plotted for the movement of the point of contact between the roller 9 (Fig. 3) and the pattern blade 4 and which is the object of Figs. 9 and 10, shows an improvement relatively to Fig. 8, the tangent $t_2$ making a smaller angle $\alpha_2$ with OX. On the other hand, the curve of the distances which is plotted for the movement of the point of contact between the roller 9' and the pattern blade 4 and which is shown in Figs. 11 and 12 is on the contrary still worse than that of Fig. 8, the tangent $t_3$ making a wide angle $\alpha_3$ with OX. Such a machine is therefore again very defective.

As explained above, the machine of Fig. 6 overcomes these drawbacks. The very satisfactory results it gives are capable of being further improved by one of the means which are the object of the present invention. Said means has the purpose and the effect of making the speed of displacement of the point of contact of the rollers or the tools on the blades still more regular.

Figure 13:
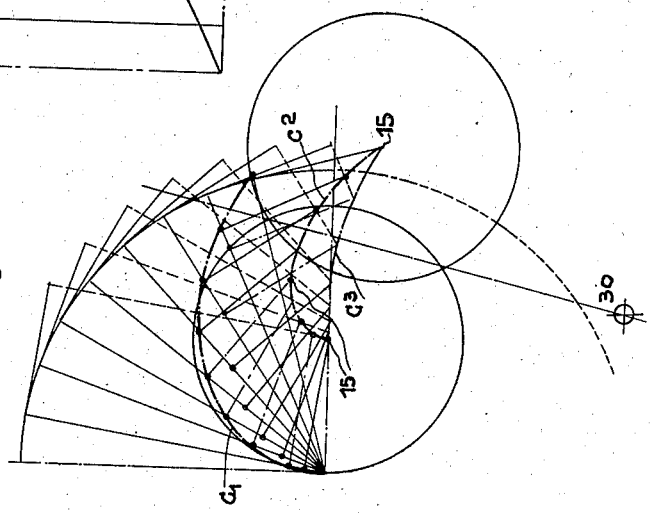

For the explanation of this invention, the curve has been drawn in Fig. 13, which would be the locus of the centres 15 of the rollers 9 if the speed of displacement of the point of contact with the blade were constant. In order to draw this curve, successive positions of the blade 4 have been drawn which are in equally spaced angular relation; on these curves the successive positions of the point of contact have been shown, which are in equally spaced relation and which therefore give a spiral of Archimede $C_1$. By drawing at these points perpendiculars equal to the radius of the roller, the required curve $C_2$ can obviously be deduced therefrom. It can be seen that said curve is convex, its convexity being turned in the opposite direction to the direction of rotation of the blade.

The object of the invention is to substitute for this curve, an arc of a circle which is the nearest approach possible to same, and for this purpose it is obvious that it is advantageous to select the position of the pivot pins of the levers supporting the rollers and the tools in a different manner from the previous one. In the embodiment shown by Figure 6, the pivot pins are placed in a vertical plane containing the axis of rotation of the blades. According to another feature of the invention, said pins are placed outside said plane, as shown at 30, in such a manner that the circular path $C_3$ of the spindles 15 of the rollers 9 is tangential to the horizontal plane passing through the axis of rotation of the blades, or even passes through said plane.

Figure 14:
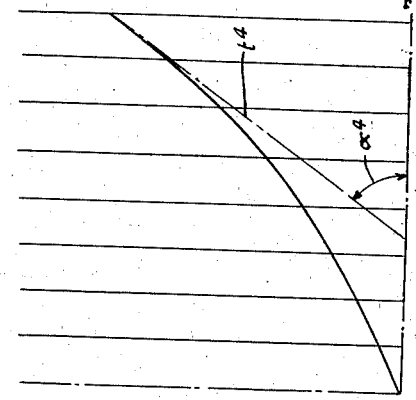

Fig. 14 gives the curve of the distances in this case, and it can be seen that the tangent $t_4$ makes an angle $\alpha_4$ substantially less than in the previous cases. This gain is the more substantial as for these angle values the trigonometrical tangent varies very rapidly.

On the other hand, the machine shown in Fig. 6 sometimes creates certain difficulties owing to its height. In many cases, it would be very desirable to arrange the axes of rotation 21' and 24' at the low part, like the axes 21 and 24. The invention enables this arrangement to be effected without however producing the drawbacks previously mentioned.

Fig. 15 shows an arrangement in which the path of the spindle of the roller is an arc of circle traced about an axis 31 located outside the figure plane, in such a manner that the concavity of said arc of a circle is arranged in the opposite direction to the direction of rotation $f$ of the blade 4. From the foregoing explanations, it will be readily understood that this circular path will not give as good results as the trajectory shown in Fig. 13.

In fact, Fig. 16 shows at $C_5$ the curve of the distances, and it can be seen that the tangent $t_5$ at the end of said curve makes an angle $\alpha_5$ which is of considerable size. But it will be noted that it is possible to improve this arrangement, as shown in Fig. 17, by using rollers 9 of greater diameter. The curve $C_6$ of Fig. 19 shows the result obtained by this means; the tangent $t_6$ forms an angle $\alpha_6$ with the axis OX, which is much smaller than the angle $\alpha_5$.

Under these conditions, according to an important feature of the invention, the axes of oscillation of the two movable systems can be arranged at the low part of the machine, as shown in Fig. 18. One of said movable systems has its axis of oscillation arranged at 32 and the other at 33. The axis 32 is arranged in the most advantageous manner, and consequently the roller 9 is of reduced diameter.

The axis 33 shown on the same horizontal plane MN as the axis 32 is substantially less remote from the vertical plane passing through the blade in its starting position, and the roller 9' is of much larger diameter. This arrangement is quite characteristic, and it can be defined as follows: when the rollers 9 and 9' are in the position in which they are nearest each other (as shown in Fig. 18), the spindles 15—15' of said rollers form with the pivot pins 32 and 33 a convex quadrilateral and no longer a triangle as in the device of Fig. 3, or a broken line as in the device of Fig. 6. Furthermore, the levers 20 and 20' which carry the spindles 15 and 15' are not of the same length, the lever 20' being larger than the lever 20; in addition, the lever 20' forms, with the direction 15'—15 a greater angle than that which is formed by the lever 20 with the direction 15—15'. Finally, the roller 9' is of greater diameter than the roller 9. It will be observed that it is not necessary for the direction 32—33 to be parallel with the direction 15—15'.

Fig. 19 shows, in a less diagrammatical manner than Fig. 18, a machine according to the invention. In this example, the axes 32 and 33 are arranged in the same horizontal plane MN as in Fig. 15, but it is pointed out that this arrangement is in no way indispensable. The lever 20 carrying the spindle 15 of the roller 9 is connected to the lever 20' carrying the spindle 15' of the tool 13 by a bar 22 similar to the one shown in Fig. 9. This system is balanced by the counterweights shown at 34. There furthermore exists an adjustable counterweight 35 to which further reference will be made hereinafter. Said counterweight is intended to hold the roller 9 in contact with the pattern blade 4.

The lever 23 which carries the roller 9' is connected by the bar 22' to the lever 23' which carries the tool 13; the whole arrangement is balanced by the counterweights 34' and there is also an adjustable counterweight 35' for this arrangement. Just as in the previous examples, the shafts 32 and 33 are supported by a carriage 6 which is movable longitudinally parallel with the axes of rotation of the blades 4 and 5.

The counterweights 35 and 35' are adjustable not only as regards their lever arms, but also as regards the angular position of said lever arms. For this purpose, the adjustment in length is effected by unscrewing the nuts 46 and by adjusting the position of the counterweights 35 and 35' on the rods 37 and 37', which are respectively fixed to the levers 20 and 23. For the adjustment of the angular position of the lever arms, the following arrangement has been adopted; the counterweights 35—35' are constructed in such a manner that their centre of gravity is not located on the axis of the rods 37 and 37'; consequently, by rotating the counterweights 35 and 35' on the rods 37 and 37', the adjustment of the angular position of the lever arm of said counterweights relatively to the levers 20 and 23 is obtained without difficulty, since the centres of gravity are raised or lowered.

Although the machine of Fig. 19 has been shown for cutting a single blade, it is quite obvious that exactly identical arrangements could be adopted for a plurality of blades; it would suffice to have a plurality of systems 20'—23' respectively connected to the bars 22—22' which had been suitably extended. It will be observed furthermore that owing to the arrangements adopted, the stresses exerted by the pattern blade 4 on the rollers 9 or 9', during the time said blade pushes same against the effect of their counterweights, are always maintained within reasonable limits, because the law of variation of such stresses does not give rise to great differences between them in the successive positions of the blade. This result cannot be obtained in the machines of the type of Fig. 1, without an increase in the diameter of the rollers which quickly becomes objectionable, the duration of useful work being inversely proportional to the diameter of the roller.

What I claim as my invention and desire to secure by Letters Patent is:

1. In a machine for the manufacture of propeller blades by copying and including a pattern blade, a blank blade, means for rotatively supporting and for synchronously causing to rotate the pattern blade and the blank blade about two parallel geometric axes, two feelers or rollers arranged on both sides of the pattern blade, rocking levers for supporting the said feelers or rollers, means for applying the feelers or rollers against the pattern blade, tools arranged on both sides of the blank blade, rocking levers for supporting the said tools, means for operatively connecting the tools rocking levers and the corresponding feeler rocking levers, the feature which consists in that the geometric oscillation axes of the feeler levers are arranged firstly on the same side of a first reference plane which contains the geometric axis of the feelers or rollers when the latter are in their nearest position, and secondly, at unequal distances on both sides of a second reference plane at right angles with the first reference plane and which contains the geometric axis of revolution of the pattern blade, the greatest distance corresponding to the geometric axis of oscillation which is at the left hand of the second reference plane for an observer who, placed in the said second plane and on the same side as that of the geometric axis of oscillation relatively to the first plane, would see the pattern blade rotating in a clockwise direction.

2. In a machine for the manufacture of propeller blades by copying according to claim 1, the feature which consists in that the length of the rocking lever the geometric axis of oscilation of which is at the greatest distance from the second reference plane, is greater than the length of the other rocking lever.

3. In a machine for the manufacture of propeller blades by copying according to claim 1, the feature which consists in that the diameter of the feeler or roller carried by the rocking lever the geometric oscillation axis of which is at the greatest distance from the second reference plane, is greater than the diameter of the feeler or roller carried by the other rocking lever.

4. In a machine for the manufacture of propeller blades by copying, according to claim 1, the feature which consists in that the length of the rocking lever the geometric oscillation axis of which is at the greatest distance from the second reference plane, and the diameter of the feeler or roller carried by the said lever, are greater than the length of the other rocking lever and the diameter of the other feeler or roller respectively.

PAULIN JEAN PIERRE RATIÉ.